United States Patent
Yokoyama et al.

(10) Patent No.: US 7,903,148 B2
(45) Date of Patent: Mar. 8, 2011

(54) APPARATUS, METHOD, AND COMPUTER PROGRAM FOR PROCESSING IMAGE, AND RECORDING MEDIUM STORING THE COMPUTER PROGRAM

(75) Inventors: Kazuki Yokoyama, Kanagawa (JP); Tetsuji Inada, Tokyo (JP); Mitsuyasu Asano, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 699 days.

(21) Appl. No.: 11/698,814

(22) Filed: Jan. 29, 2007

(65) Prior Publication Data
US 2007/0177030 A1    Aug. 2, 2007

(30) Foreign Application Priority Data
Jan. 31, 2006 (JP) ............................ P2006-022215

(51) Int. Cl.
*H04N 5/228* (2006.01)
*H04N 5/208* (2006.01)
*H04N 5/217* (2006.01)
*H04N 5/21* (2006.01)
*G06K 9/40* (2006.01)

(52) U.S. Cl. ................... 348/222.1; 348/252; 348/241; 348/625; 382/266

(58) Field of Classification Search ............ 348/222.1, 348/234, 241, 252, 625, 627
See application file for complete search history.

(56) References Cited

U.S. PATENT DOCUMENTS

| 5,200,824 | A * | 4/1993 | Kageyama | 348/607 |
| 6,724,943 | B2 * | 4/2004 | Tsuchiya et al. | 382/261 |
| 7,321,401 | B2 * | 1/2008 | Aida et al. | 348/625 |
| 7,382,414 | B2 * | 6/2008 | Nakajima et al. | 348/625 |
| 7,561,209 | B2 * | 7/2009 | Zhu | 348/630 |
| 7,639,312 | B2 * | 12/2009 | Baba et al. | 348/790 |
| 2004/0201722 | A1 * | 10/2004 | Gomi et al. | 348/222.1 |
| 2005/0128358 | A1 * | 6/2005 | Nakajima et al. | 348/678 |
| 2005/0140829 | A1 * | 6/2005 | Uchida et al. | 348/625 |

FOREIGN PATENT DOCUMENTS

| JP | 2001-298621 | 10/2001 |
| JP | 2003-110855 | 4/2003 |
| JP | 2005-101949 | 4/2005 |
| JP | 2005-141209 | 6/2005 |
| JP | 2005-309945 | 11/2005 |

\* cited by examiner

*Primary Examiner* — Nhan T Tran
(74) *Attorney, Agent, or Firm* — Finnegan Henderson Farabow Garrett & Dunner LLP

(57) ABSTRACT

An image processing apparatus includes an image quality correction circuit for correcting an image quality of input video data by enhancing the input video data and a control circuit for controlling the image quality correction circuit. The control circuit detects a signal level of a high-frequency component of the input video data and controls the image quality correction circuit in response to the signal level detection result so that the degree of enhancement of the input video data is increased in response to an increase in the signal level of the high-frequency component.

5 Claims, 15 Drawing Sheets

RESULT OF DETECTION OF
HIGH-FREQUENCY COMPONENT

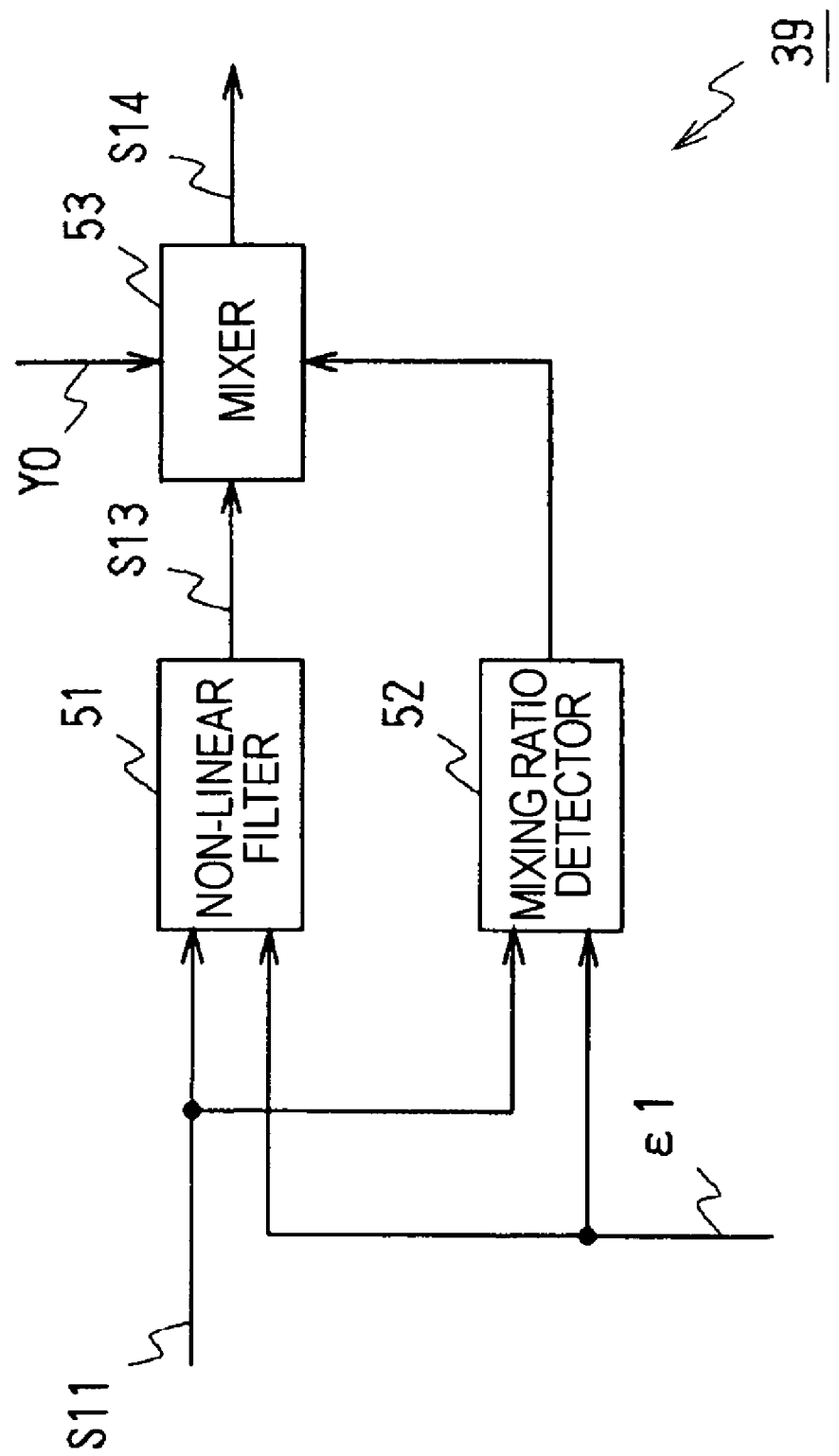

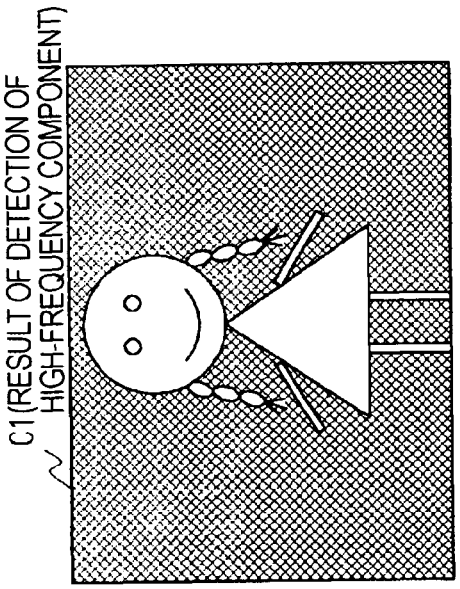
FIG. 14A1
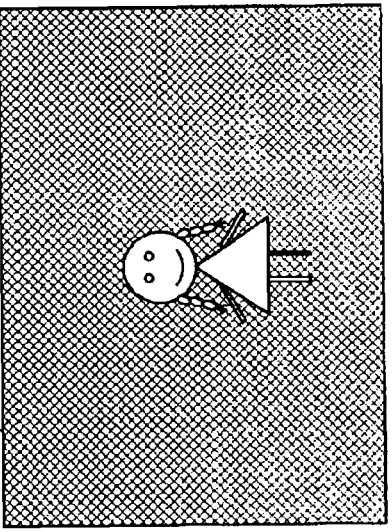
FIG. 14B1 C1 (RESULT OF DETECTION OF HIGH-FREQUENCY COMPONENT)
FIG. 14A2
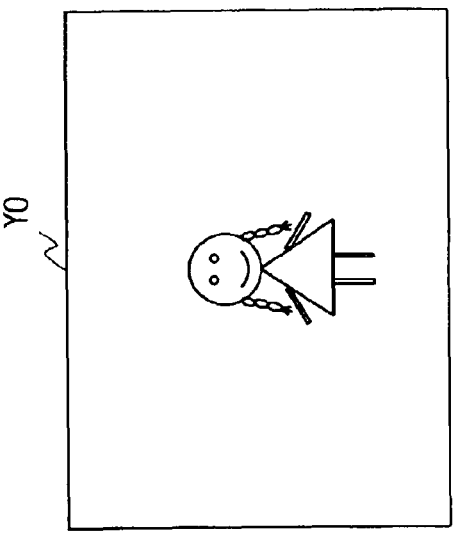
FIG. 14B2 C1 (RESULT OF DETECTION OF HIGH-FREQUENCY COMPONENT)

APPARATUS, METHOD, AND COMPUTER PROGRAM FOR PROCESSING IMAGE, AND RECORDING MEDIUM STORING THE COMPUTER PROGRAM

CROSS REFERENCES TO RELATED APPLICATIONS

The present invention contains subject matter related to Japanese Patent Application JP 2006-022215 filed in the Japanese Patent Office on Jan. 31, 2006, the entire contents of which are incorporated herein by reference.

BACKGROUND OF THE INVENTION

1. Field of the Invention

The present invention relates to an apparatus, method, computer program for processing an image, and a recording medium storing the computer program. More particularly, the present invention relates to an enhancement process of a high-frequency component of input video data with noise caused image degradation reduced by performing image correction with the input video data enhanced and by increasing the degree of enhancement of the input video data as the intensity of the high-frequency component of the input video data increases.

2. Description of the Related Art

Known video apparatuses processing a variety of video data such as a video signal improve image quality by enhancing a high-frequency component of the data.

Japanese Unexamined Patent Application Publication No. 2001-298621 discloses a technique that extracts a high-frequency component using a non-linear smoothing filter and improves contrast and sharpness of image. As shown in FIG. 15, an image processing circuit 1 disclosed in Japanese Unexamined Patent Application Publication No. 2001-298621 limits a bandwidth of an input video signal S1 using a non-linear smoothing filter 2 such as a two-dimensional ∈ filter, and smoothes the input video signal S1 with an edge component thereof preserved, thereby outputting a video signal S2. The image processing circuit 1 subtracts the video signal S2 output from the non-linear smoothing filter 2 from the input video signal S1 using a subtractor circuit 3, thereby outputting a signal S4. The signal S4 has a high-frequency component of the video signal S1 with the edge component reduced therefrom. The image processing circuit 1 multiplies the high-frequency component signal S4, thereby adjusting the resulting product in level using a multiplier circuit 4. An adder circuit 5 in the image processing circuit 1 adds the output of the multiplier circuit 4 to the output signal S2 of the non-linear smoothing filter 2. The image processing circuit 1 thus outputs a video signal S5 with the edge component not enhanced but with contrast and sharpness of image improved.

In accordance with the known high-frequency region enhancement method, a noise component is also enhanced and image degradation results. Such a noise component becomes pronounced in an image of the sky, for example, where a high-frequency component is low in level and has no significant meaning in the image.

SUMMARY OF THE INVENTION

It is thus desirable to provide an apparatus, method, computer program, and recording medium for performing a high-frequency component enhancement process with noise caused image degradation reduced.

In accordance with one embodiment of the present invention, an image processing apparatus includes an image quality correction circuit for correcting an image quality of input video data by enhancing the input video data and a control circuit for controlling the image quality correction circuit. The control circuit detects a signal level of a high-frequency component of the input video data and controls the image quality correction circuit in response to the signal level detection result so that the degree of enhancement of the input video data is increased in response to an increase in the signal level of the high-frequency component.

In accordance with one embodiment of the present invention, an image processing method includes an image quality correcting step of correcting an image quality of input video data by enhancing the input video data, and a controlling step of controlling the image quality correcting step, the controlling step including detecting a signal level of a high-frequency component of the input video data and controlling the image quality correcting step in response to the signal level detection result so that the degree of enhancement of the input video data is increased in response to an increase in the signal level of the high-frequency component.

In accordance with one embodiment of the present invention, a computer program for causing a computer to correct image quality of input video data, includes an image quality correcting step of correcting an image quality of the input video data by enhancing the input video data, and a controlling step of controlling the image quality correcting step, the controlling step including detecting a signal level of a high-frequency component of the input video data and controlling the image quality correcting step in response to the signal level detection result so that the degree of enhancement of the input video data is increased in response to an increase in the signal level of the high-frequency component.

In accordance with one embodiment of the present invention, a recording medium stores a computer program for causing a computer to correct image quality of input video data. The computer program includes an image quality correcting step of correcting an image quality of input video data by enhancing the input video data, and a controlling step of controlling the image quality correcting step, the controlling step including detecting a signal level of a high-frequency component of the input video data and controlling the image quality correcting step in response to the signal level detection result so that the degree of enhancement of the input video data is increased in response to an increase in the signal level of the high-frequency component.

The image processing apparatus includes the image quality correction circuit for correcting the image quality of the input video data by enhancing the input video data and the control circuit for controlling the image quality correction circuit. The control circuit detects the signal level of the high-frequency component of the input video data and controls the image quality correction circuit in response to the signal level detection result so that the rate of enhancement of the input video data is increased in response to the increase in the signal level of the high-frequency component. In an area of image where the presence of noise tends to catch user's attention, the degree of enhancement of the input video data is reduced. As a result, the noise becomes less outstanding. The high-frequency component enhancement process is thus performed with noise caused image degradation reduced more than in the known art.

In accordance with embodiments of the present invention, the apparatus, the method, the computer program and the recording medium for performing the high-frequency component enhancement process with noise caused image degradation reduced are provided.

BRIEF DESCRIPTION OF THE DRAWINGS

FIG. 8 is a block diagram of a non-linear smoothing circuit of the non-linear smoothing filter of FIG. 7;

FIGS. 14A1-14B2 illustrate a setting process of the correction coefficient in the image processing circuit of FIG. 10.

DESCRIPTION OF THE PREFERRED EMBODIMENTS

Figure 2:
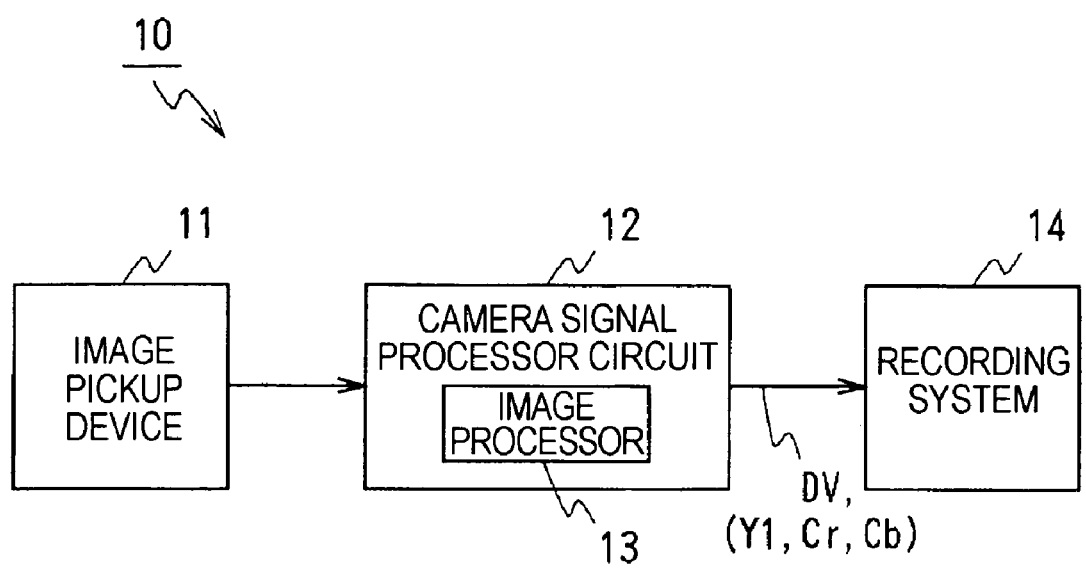
FIG. 2 is a block diagram of the image pickup apparatus of FIG. 1.

FIG. 2 is a block diagram of an image pickup apparatus 10 as an image processing apparatus in accordance with one embodiment of the present invention. In the image pickup apparatus 10, an image pickup device 11 is a charge coupled device or solid-state image pickup device and outputs an optical image pickup result focused on an imaging surface through a lens (not shown).

A camera signal processor circuit 12 performs a calculation process, an analog-to-digital conversion process, a gamma correction process, a white-balance process, and other processes on the image pickup result output from the image pickup device 11, and then outputs video data DV composed of luminance data Y1, and color difference data Cr and Cb. In this series of processes, an image processor 13 in the camera signal processor circuit 12 outputs the video data VD with the high-frequency component thereof enhanced.

The image pickup apparatus 10 displays on display means a monitor image of the video data VD output from the camera signal processor circuit 12. In response to a user operation input, a recording system 14 compresses the video data VD and records the compressed video data VD onto one of recording media. The recording media include an optical disk, a magneto-optical disk, a magnetic tape, and a memory card.

Figure 1:
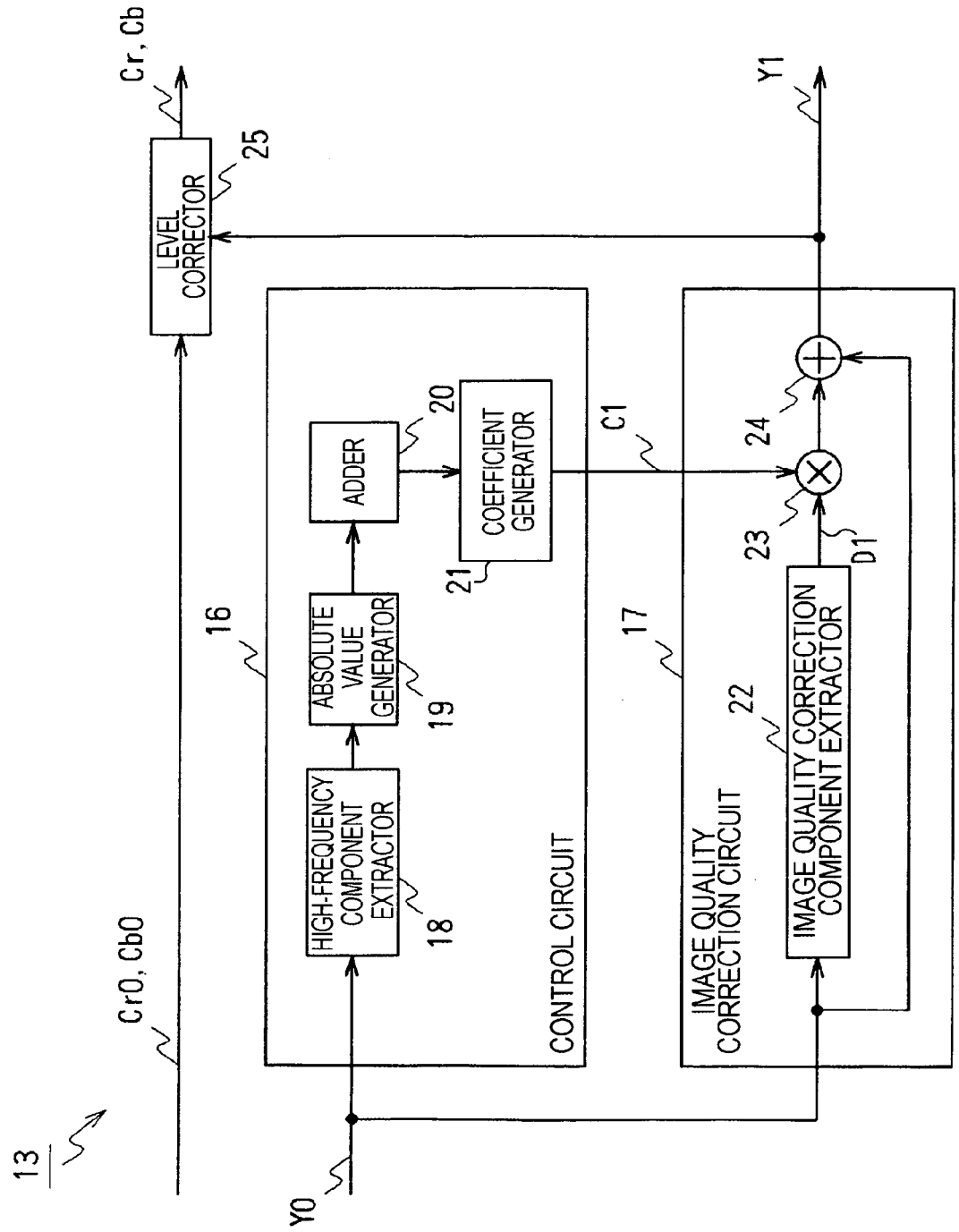
FIG. 1 is a block diagram of an image processing circuit in an image pickup apparatus in accordance with a first embodiment of the present invention.

FIG. 1 is a block diagram of the image processor 13 used in the image pickup apparatus 10. In the image processor 13, an image quality correction circuit 17 enhances a high-frequency component of the video signal to improve image quality. The image quality correction circuit 17 is controlled by a control circuit 16.

In the control circuit 16, a high-frequency component extractor 18 is composed of a high-pass filter circuit, etc., and extracts a high-frequency signal from luminance data Y0. An absolute value generator 19 converts an output signal from the high-frequency component extractor 18 into an absolute value of the output signal, and then outputs the absolute output signal. An adder 20 sums output signals from the absolute value generator 19 on a per block basis and detects a signal level of the high-frequency component of the luminance data Y0 on a per block basis. One block herein is composed of 8×8 pixels. As necessary, a variety of size may be set for the block as a unit for detecting the signal level. The size of the block may be adaptively varied in response to the signal level of the high-frequency component. The signal level may be detected on a per pixel basis.

Figure 3A:
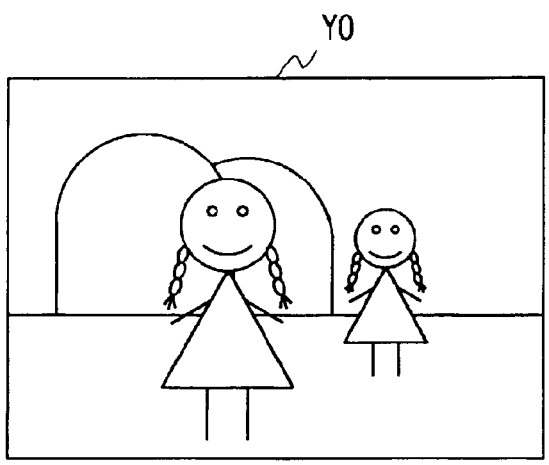
FIGS. 3A and 3B illustrate a setting process of a correction coefficient of the image processing circuit of FIG. 1.
Figure 3B:
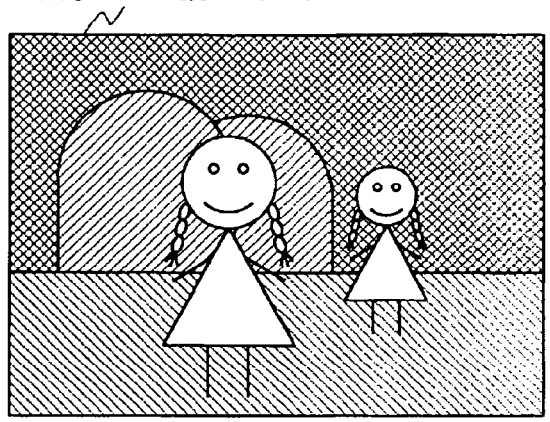

FIGS. 3A and 3B illustrate examples of high-frequency component detected by the control circuit 16. As shown in FIG. 3B, the higher the signal level of the high-frequency component, the whiter the corresponding area becomes. The background wall has thus almost no high-frequency component.

Figure 4:
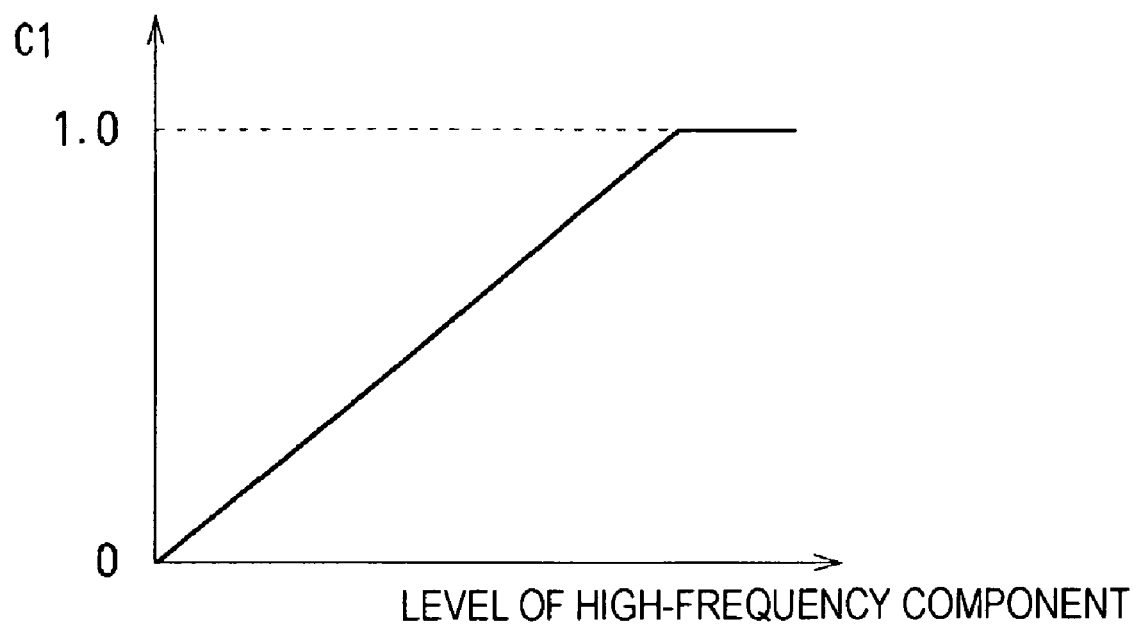
FIG. 4 is a plot of characteristics of the correction coefficient of the image processing circuit of FIG. 1.

In response to the signal level detection result of the high-frequency component, a coefficient generator 21 in the control circuit 16 generates a correction coefficient C1 that controls operation of the image quality correction circuit 17. Specifically, the coefficient generator 21 generates the correction coefficient C1 so that the higher the signal level of the high-frequency component, the more the image quality correction circuit 17 enhances the luminance data Y0. More specifically, as shown in FIG. 4, the coefficient generator 21 generates the correction coefficient C1 so that the correction coefficient C1 varies within a range from value 0 to value 1 in proportion to the signal level of the high-frequency component, and so that the correction coefficient C1 flattens off at the value 1 when the signal level of the high-frequency component rises above a certain value.

By enhancing the high-frequency component of the luminance data Y0, the image quality correction circuit 17 improves image quality of the video data from the luminance data Y0. The image quality correction circuit 17 varies the degree of enhancement of the high-frequency component in response to the correction coefficient C1 output from the control circuit 16. Under the control of the control circuit 16, the image quality correction circuit 17 thus varies the degree of enhancement of the high-frequency component, thereby improving image quality.

In the image quality correction circuit 17, an image quality correction component extractor 22 extracts from the luminance data Y0 a signal component for improving image quality. Since the high-frequency component of the luminance data Y0 is enhanced in the present embodiment, the image quality correction component extractor 22 extracts a high-frequency component D1 from the luminance data Y0 using a high-pass filter and outputs the high-frequency component D1, for example. The image quality correction component extractor 22 may be integrated with the control circuit 16 in structure.

A multiplier 23 weights the output signal from the image quality correction component extractor 22 with the correction coefficient C1 output from the control circuit 16, and outputs the weighted output signal. The image processor 13 thus enhances the high-frequency component D1 of the video data where the noise effect tends to draw less the user's attention because of the presence of the high-frequency component and reduces the degree of enhancement in a flat area where the noise effect tends to draw more the user's attention. The multiplier 23 constitutes a level adjusting circuit that varies, under the control of the control circuit 16, the signal level of the high-frequency component D1 extracted by the image quality correction component extractor 22.

An adder 24 adds an output signal D2 of the multiplier 23 to the original luminance data Y0, thereby outputting luminance data Y1 with the high-frequency component thereof enhanced.

A level corrector 25 adjusts the signal level of color difference data Cr and Cb so that the ratio of the color difference data Cr and Cb to the resulting luminance data Y1 equals the ratio of the color difference data Cr and Cb to the original luminance data Y0, and outputs the adjusted color difference data Cr and Cb. The level corrector 25 thus prevents hue of the image from being varied.

In the image pickup apparatus 10 (FIG. 2), the image pickup result obtained from the image pickup device 11 is processed by the camera signal processor circuit 12 in this way, and then displayed as a monitor image and recorded on the recording system 14 in response to an operational input from the user. The image processor 13 in the camera signal processor circuit 12 thus enhances the high-frequency component of the luminance data Y1, thereby improving image quality.

In the image processor 13, the image quality correction component extractor 22 extracts the high-frequency component D1 from the luminance data Y0, the multiplier 23 adjusts the level of the high-frequency component D1, and the adder 24 adds the level-adjusted high-frequency component D1 to the luminance data Y0. The luminance data Y0 is thus improved in image quality with the high-frequency component enhanced.

The control circuit 16 detects the signal level of the high-frequency component of the luminance data Y0 on a per block basis, and generates, based on the detection result, the correction coefficient C1 that varies within a range from a value 0 to a value 1 in proportion to the signal level of the high-frequency component. The image quality correction circuit 17 adjusts the level of the high-frequency component D1 with the correction coefficient C1 to enhance the high-frequency component. The image quality correction circuit 17 thus controls the degree of enhancement in proportional to the signal level of the high-frequency component.

The luminance data Y1 output from the image processor 13 has a sufficiently enhanced high-frequency component where the presence of a strong high-frequency component causes an addition of noise effect to draw less the user's attention. Sharpness is thus sufficiently improved. The degree of enhancement is reduced in a flat area in image where the presence of the noise effect draws more the user's attention. Noise caused image degradation is sufficiently controlled. Image quality is thus improved with noise caused image degradation reduced and the high-frequency component enhanced.

In accordance with the first embodiment of the present invention, the input video data is enhanced to improve image quality. As the high-frequency component is intensified, the degree of enhancement of the input video data is increased. The high-frequency component is enhanced with noise caused image degradation reduced.

Figure 5:
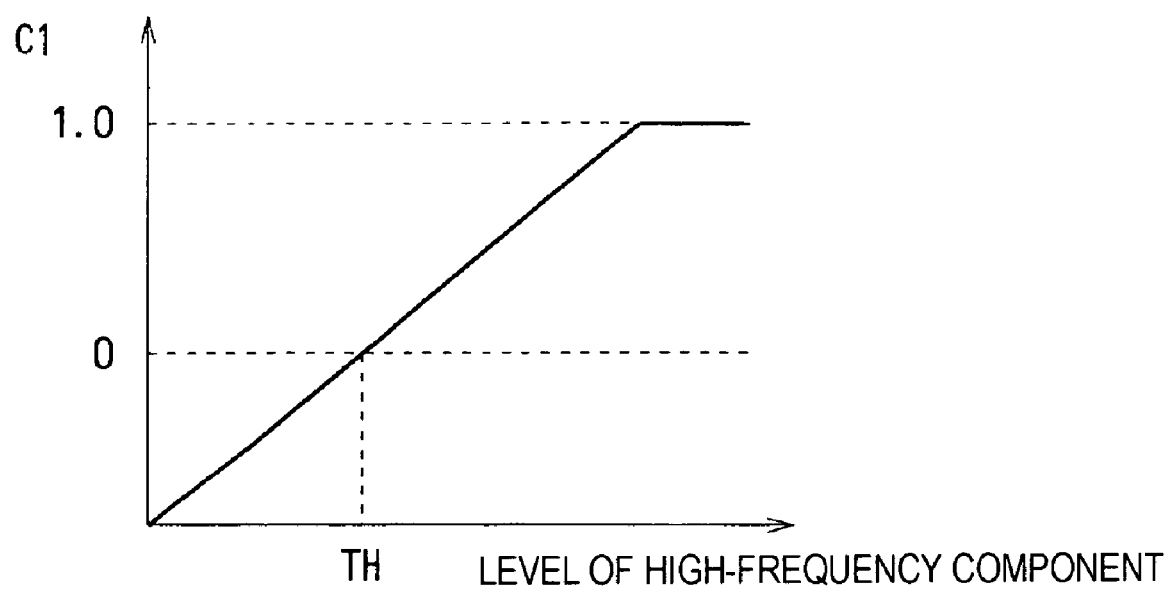
FIG. 5 is a plot of characteristics of the correction coefficient of the image processing circuit in accordance with a second embodiment of the present invention.

FIG. 5 illustrates a characteristic curve representing the characteristics of the correction coefficient C1 in the image pickup apparatus in accordance with a second embodiment of the present invention. The image pickup apparatus is identical in structure to the image pickup apparatus of the first embodiment except for the setting method of the correction coefficient C1.

In accordance with the second embodiment of the present invention, the correction coefficient C1 varies in proportion to the signal level of the high-frequency component detected by the control circuit 16. When the signal level of the high-frequency component rises above a predetermined value, the correction coefficient C1 flattens off at a value 1. The correction coefficient C1 becomes zero when the signal level of the high-frequency component falls to a predetermined threshold value TH. When the signal level of the high-frequency component falls below the predetermined threshold value TH, the correction coefficient C1 becomes smaller than zero.

In accordance with the second embodiment, when the signal level of the high-frequency component is higher than the threshold value TH, the degree of enhancement is varied to enhance the high-frequency component, and the noise caused image degradation is reduced. Image quality is thus improved. When the signal level of the high-frequency component is lower than the threshold value TH, the high-frequency component is reduced to make the noise effect less pronounced. Image quality is also improved.

In accordance with the second embodiment, the degree of enhancement is varied in response to the high-frequency component in a manner such that the high-frequency component is enhanced. Within a range where the signal level of the high-frequency component is low, the high-frequency component is reduced. Noise caused image degradation is even more reduced. The enhancement of the high-frequency component leads to a further improvement of image quality.

Figure 6:
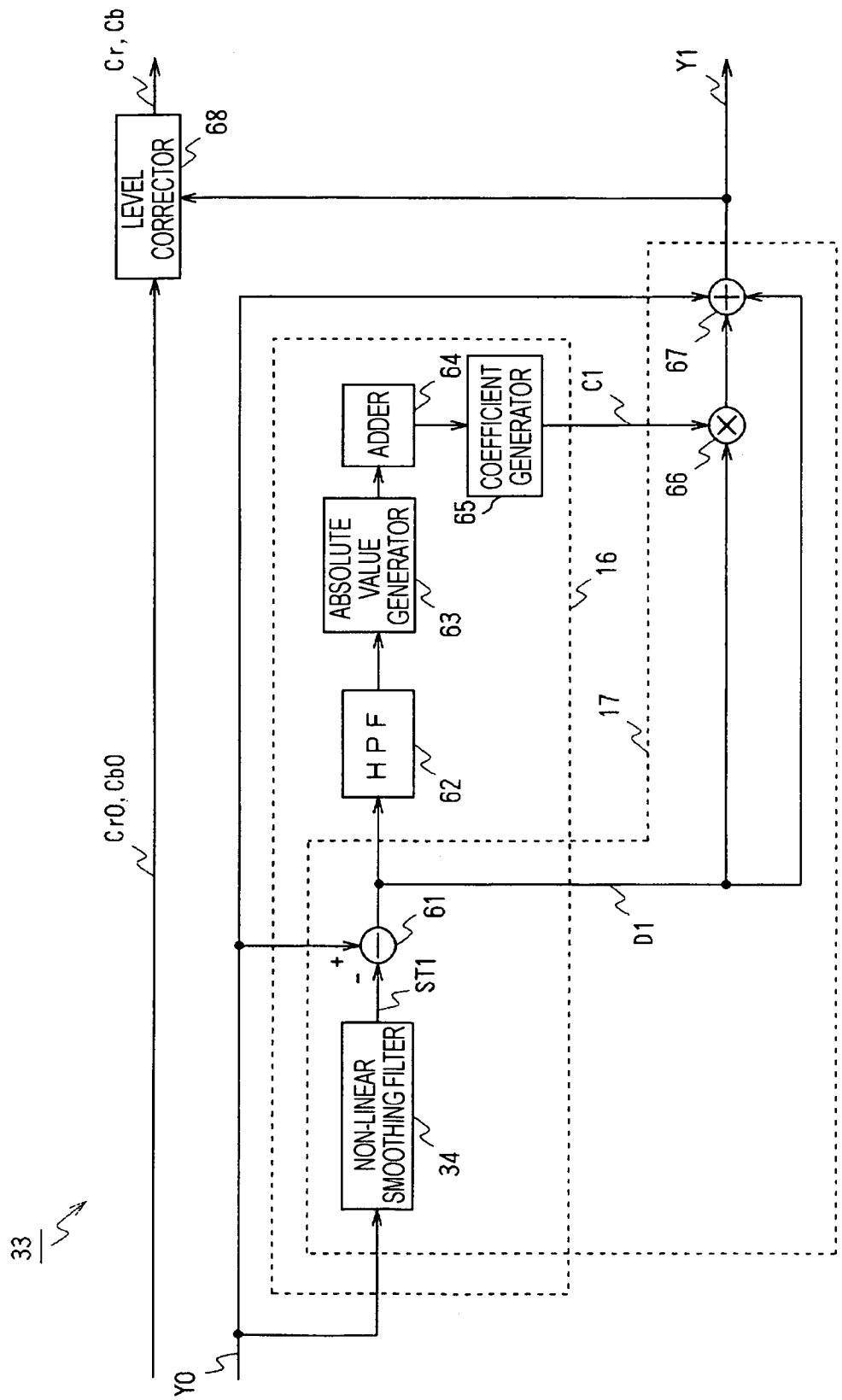
FIG. 6 is a block diagram of an image processing circuit in an image pickup apparatus in accordance with a third embodiment of the present invention.

FIG. 6 is a block diagram of an image processing circuit 33 applied to the image pickup apparatus in accordance with a third embodiment of the present invention. The image processing circuit 33 improves image quality by enhancing the high-frequency component of the video data composed of luminance data and color difference data Cr and Cb. The image pickup apparatus of the third embodiment is identical in structure to the image pickup apparatus 10 of the first embodiment shown in FIG. 1 except that the image processing circuit 33 is substituted for the image processor 13. In the image processing circuit 33, part of the mechanism for extracting the high-frequency component is shared by the control circuit 16 and the image quality correction circuit 17 and a non-linear smoothing filter 34 is used to extract the high-frequency component. The rest of the structure of the image processing circuit 33 is identical to the image processor 13.

Figure 7:
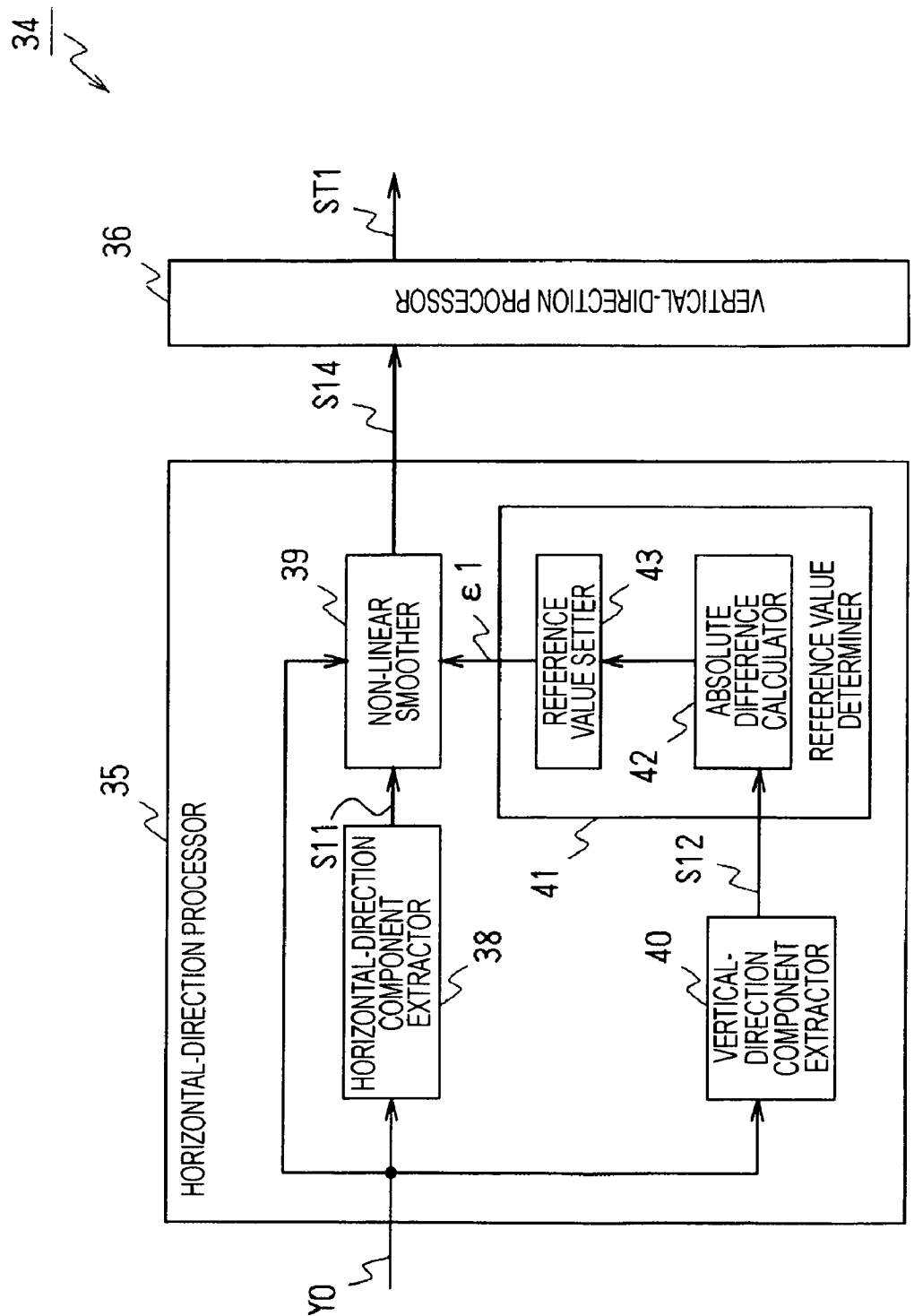
FIG. 7 is a block diagram of a non-linear smoothing filter in the image processing circuit of FIG. 6.

The non-linear smoothing filter 34 smoothes the luminance data Y0 with an edge portion thereof preserved. As shown in FIG. 7, the non-linear smoothing filter 34 successively smoothes in a horizontal direction and a vertical direction the luminance data Y1 with the edge component preserved using a horizontal-direction processor 35 and a vertical-direction processor 36, respectively.

The non-linear smoothing filter 34 successively inputs to a horizontal-direction component extractor 38 the luminance data Y0 from a buffer memory (not shown) in a raster sequence. The horizontal-direction component extractor 38 successively delays the luminance data Y0 through a shift register having a predetermined number of stages. The horizontal-direction component extractor 38 outputs to a non-linear smoother 39 a plurality of samples of luminance data S11 from the shift register at a time in parallel. The plurality of luminance data S11 is composed of data at a target sampling point and a plurality of sampling points in front of and behind the target sampling point in a horizontal direction. In this way, the horizontal-direction component extractor 38 outputs the luminance data S11 at the plurality of sampling points to the non-linear smoother 39 for smoothing process.

A vertical-direction component extractor 40 receives and then transfers the luminance data Y0 at a line buffer having a plurality of stages connected in cascade, and outputs the luminance data Y0 respectively output from the line buffers to a reference value determiner 41. In this way, the vertical-direction component extractor 40 outputs luminance data S12 at a target sampling point of the horizontal-direction component extractor 38 and a plurality of sampling points above and below the target sampling point in a vertical direction to the reference value determiner 41.

The reference value determiner 41 detects a variation in the sample values at the sampling points adjacent to the target sampling point from the luminance data S12 at the sampling points consecutively arranged in a vertical direction output from the vertical-direction component extractor 40. In response to the magnitude of variation in the sample values, the reference value determiner 41 determines a reference value $\epsilon 1$ to be supplied for a non-linear smoothing process. The reference value determiner 41 thus sets the reference value $\epsilon 1$ so that the non-linear smoother 39 appropriately performs the smoothing process.

An absolute difference calculator 42 in the reference value determiner 41 receives the luminance data S12 at the plurality of sampling points consecutively arranged in a vertical direction output from the vertical-direction component extractor 40. The absolute difference calculator 42 subtracts the luminance data at the target sampling point from the luminance data at a next sampling point, and then converts the resulting difference into an absolute difference. The absolute difference calculator 42 detects absolute differences at the plurality of sampling points consecutively arranged in a vertical direction with respect to the target sampling point.

A reference value setter 43 detects a maximum value from among the plurality of absolute differences at the plurality of sampling points consecutively arranged in a vertical direction detected by the absolute difference calculator 42, and adds a constant margin to the maximum absolute difference as the reference value $\epsilon 1$. For example, the reference value setter 43 sets 10% as a margin, thereby setting 1.1 times the maximum absolute difference as the reference value $\epsilon 1$.

The non-linear smoother 39 performs a non-linear smoothing process on the luminance data S11 at the plurality of sampling points consecutively arranged in a horizontal direction output from the horizontal-direction component extractor 38, with respect to the reference value $\epsilon 1$. In this process, the non-linear smoother 39 weight-averages the smooth process result and the original luminance data Y1 to compensate for a weak edge component that is lost in the smoothing process, and outputs the averaged result.

As shown in FIG. 8, a non-linear filter 51 in the non-linear smoother 39 is an $\epsilon$ filter. The non-linear filter 51 performs a non-linear smoothing process on the luminance data S11 at the plurality of sampling points consecutively arranged in a horizontal direction output from the horizontal-direction component extractor 38 with respect to the reference value $\epsilon 1$ output from the reference value determiner 41. The non-linear filter 51 thus smoothes the luminance data Y0 with a component varying greatly beyond the reference value $\epsilon 1$ preserved. The non-linear filter 51 stores a signal level that greatly varies beyond the reference value $\epsilon 1$. The reference value $\epsilon 1$ is determined based on the variation in the sample values in a vertical direction. The non-linear filter 51 thus performs a non-linear smoothing process on the luminance data Y0 in a horizontal direction.

A mixer 53 weight averages luminance data S13 output from the non-linear filter 51 and the original luminance data Y0 using weight coefficients calculated by a mixing ratio detector 52, and outputs luminance data S14.

The mixing ratio detector 52 detects a variation in the signal level at a sampling point adjacent to the target sampling point in a horizontal direction with respect to a signal level at the target sampling point, from the luminance data S11 at the plurality of sampling points consecutively arranged in a horizontal direction output from the horizontal-direction component extractor 38. The mixing ratio detector 52 also detects the presence of a weak edge based on the detected variation in the signal level. Based on the detection result, the mixing ratio detector 52 further calculates the weight coefficient for use in the weight averaging process of the mixer 53.

More specifically, the mixing ratio detector 52 determines a certain percentage of the reference value $\epsilon 1$ detected in the vertical direction by the reference value determiner 41 or subtracts a certain value from the reference value $\epsilon 1$, as a reference value $\epsilon 2$ smaller than the reference value $\epsilon 1$. The reference value $\epsilon 2$ is set up so that a weak edge component smoothed through the non-linear smoothing process using the reference value $\epsilon 1$ is detected in comparison with an absolute difference to be discussed later. The reference value $\epsilon 1$ is set up depending on the variation in the signal level in a vertical direction.

The mixing ratio detector 52 receives the luminance data S11 at the plurality of sampling points consecutively arranged in a horizontal direction output from the horizontal-direction component extractor 38, and calculates successively the absolute differences, each absolute difference between the luminance data at the target sampling point and the luminance data at each of the sampling points adjacent to the target sampling point. The mixing ratio detector 52 determines that there is no weak edge if each of all calculated absolute differences is smaller than the reference value $\epsilon 2$.

If any of the calculated absolute differences is not lower than the reference value $\epsilon 2$, the mixing ratio detector 52 determines whether the sampling point having the reference value $\epsilon 2$ or higher is ahead of or behind the target sampling point and also determines the polarity of the difference of that sampling point. If there are sampling points having the reference value $\epsilon 2$ or higher both ahead of and behind the target sampling point, and if those sampling points have the same polarity, the sample value may temporarily increase due to noise. The mixing ratio detector 52 thus determines that there is no weak edge.

If the sampling point having the reference value $\epsilon 2$ or higher is present ahead of or behind the process sampling rather than on both sides of the target sampling point, or if the sampling points, present on both sides of the target sampling point, provides the difference values different in polarity, the sample value changes slightly across the target sampling point. The mixing ratio detector 52 determines that there is a weak edge.

If it is determined that there is a weak edge, the mixing ratio detector 52 determines the weight coefficient to be used in the weight averaging process of the mixer 53 so that the original luminance data Y1 is selectively output.

If it is determined that there is no weak edge, the weight coefficient to be used in the weight averaging process of the mixer 53 is set so that the component of the luminance data S13 obtained through the non-linear smoothing process is increased in luminance data S14 output from the mixer 53 in response to the maximum value of the absolute differences used to result in the reference value $\epsilon 2$. In the setting of the weight coefficient, the weight coefficient related to the luminance data S13 obtained through the non-linear smoothing process is linearly increased from a value 0 to a value 1 in proportion to the increase in the maximum value of the absolute difference. When the maximum value of the absolute difference rises above a constant value, only the luminance data S13 obtained through the non-linear smoothing process is selectively output. If it is determined that there is no edge, the mixing ratio detector 52 sets the weight to be larger in the smoothing process as a variation in the sample value becomes larger. The luminance data is output in this setting.

The horizontal-direction processor 35 performs the non-linear smoothing process on the luminance data Y0 in a horizontal direction so as to preserve a variation in the sample value equal to or larger than the variation in the sample values at the consecutive sampling points in a vertical direction. The horizontal-direction processor 35 detects an edge related to a variation in the sample value in the horizontal direction smaller than the variation in the sample values at the sampling points consecutively arranged in a vertical direction. If there is such a variation, the horizontal-direction processor 35 selectively outputs the original luminance data Y0. If there is no such a variation, the horizontal-direction processor 35 weight averages the luminance data S14 resulting from the non-linear smoothing process and the original luminance data Y0 in response to the magnitude of the variation in the sample value in the horizontal direction, and outputs the weight-averaged luminance data. The horizontal-direction processor 35 smoothes the luminance data Y0 in a horizontal direction with the weak edge component preserved.

A vertical-direction processor 36 (FIG. 7) performs the vertical smoothing process on the luminance data S14 output from the horizontal-direction processor 35. The vertical-direction processor 36 performs the vertical non-linear smoothing process on the luminance data S14 so that a variation in the sample value equal to or larger than a variation in the sample values at the sampling points consecutively arranged in a horizontal direction is preserved. The vertical-direction processor 36 also detects an edge related to a variation in the sample value in a vertical direction smaller than the variation in the sample values at the sampling points arranged consecutively in a horizontal direction. If there is such an edge, the vertical-direction processor 36 selectively outputs the original luminance data S14. If there is no such an edge, the vertical-direction processor 36 weight averages the non-linear smoothing process result and the original luminance data S14 in response to the magnitude of the variation in the sample values in the vertical direction. The vertical-direction processor 36 thus vertically smoothes the luminance data Y1 with the weak edge component preserved.

The non-linear smoothing filter 34 smoothes the luminance data Y0 with the weak edge component preserved, and then outputs luminance data ST1 as a process result.

A subtractor 61 subtracts the luminance data ST1 output from the non-linear smoothing filter 34 from the original luminance data Y0, thereby generating and outputting the high-frequency component D1 with the edge component removed therefrom.

In accordance with the second embodiment, the non-linear smoothing filter 34 and the subtractor 61 corresponds to the image quality correction component extractor 22 of the first embodiment.

A high-pass filter (HPF) 62 extracts a further high-frequency component from the high-frequency component D1 output from the subtractor 61 and outputs the extracted high-frequency component. An absolute value generator 63 converts an output signal from the HPF 62 into an absolute value. An adder 64 adds output signals from the absolute value generator 63 on a per block basis, thereby outputting a signal level detection result of the high-frequency component. In response to the signal level detection result of the high-frequency component, the coefficient generator 65 generates and outputs the correction coefficient C1 in the same way as previously discussed with reference to FIG. 4 or FIG. 5.

The non-linear smoothing filter 34, the subtractor 61, the HPF 62, the absolute value generator 63, the adder 64, and the coefficient generator 65 in the third embodiment correspond to the control circuit 16 in the first embodiment.

A multiplier 66 multiplies the high-frequency component D1 output from the subtractor 61 by the correction coefficient C1, thereby adjusting the high-frequency component D1 in level and outputting the level-adjusted high-frequency component. An adder 67 adds the output signal from the multiplier 66, the high-frequency component D1 output from the subtractor 61, and the original luminance data Y0, thereby outputting image-quality improved luminance data Y1 with the high-frequency component enhanced.

A level corrector 68 adjusts the signal level of the color difference data Cr and Cb so that the ratio of the color difference data Cr and Cb to the luminance data Y1 as a process result equals the ratio of the color difference data Cr and Cb to the original luminance data Y0, and outputs the resulting color difference data Cr and Cb. The level corrector 68 thus prevents hue of the image from being varied.

In accordance with the third embodiment, the video signal is smoothed with the weak edge component preserved, and the high-frequency component for use in image quality correction is thus extracted. Unnatural edge is controlled. The third embodiment thus provides the same advantages of the first embodiment.

Figure 9A:
FIG. 9 illustrates operation of the image processing circuit of FIG. 6.
Figure 9C:
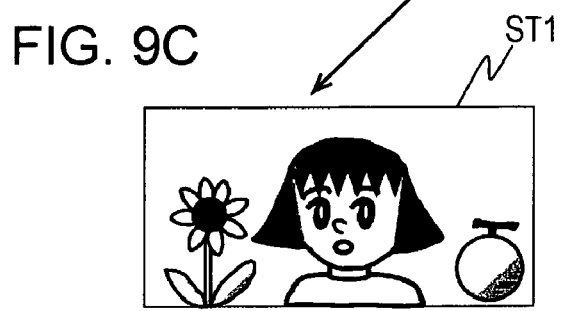
Figure 9D:
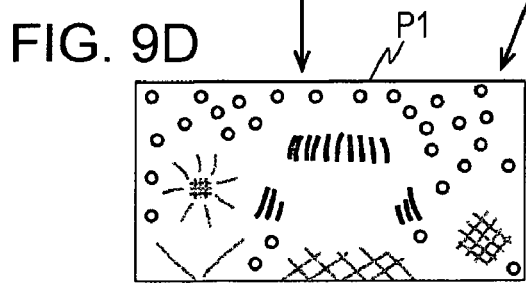
Figure 9B:
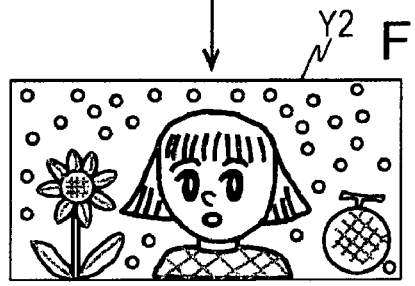

FIGS. 9A-9D illustrate images obtained through the high-frequency component extraction process of the present embodiment in contrast with images obtained through known high-frequency extraction process. In accordance with the known technique, a high-frequency component Y2 (FIG. 9B) is obtained by limiting bandwidth on an input image Y0 (FIG. 9A) with a high-pass filter. Contained in the high-frequency component Y2 is an edge component besides fine variations in luminance of an image including head hair, clothes, a fine structure of a flower, etc. Similarly, a noise component is contained in the high-frequency component Y2. In contrast, if the smoothing process is performed using a non-linear smoothing filter with the edge component preserved in accordance with the third embodiment of the present invention, the edge component is extracted as shown in FIG. 9C with mean luminance level of each portion of the input image Y0 (FIG. 9A) preserved. More specifically, in the smoothing process result ST1, the fine variations in luminance of an image including head hair, clothes, a fine structure of a flower, etc. are selectively smoothed. If the smoothing process result ST1 is subtracted from the original luminance data Y0, the fine variations in luminance in the image less the edge component can be extracted. In this way, only a component useful in improving sharpness can be extracted as shown in FIG. 9D.

The third embodiment is free from unnatural edge and provides the same advantages as the first embodiment.

Figure 10:
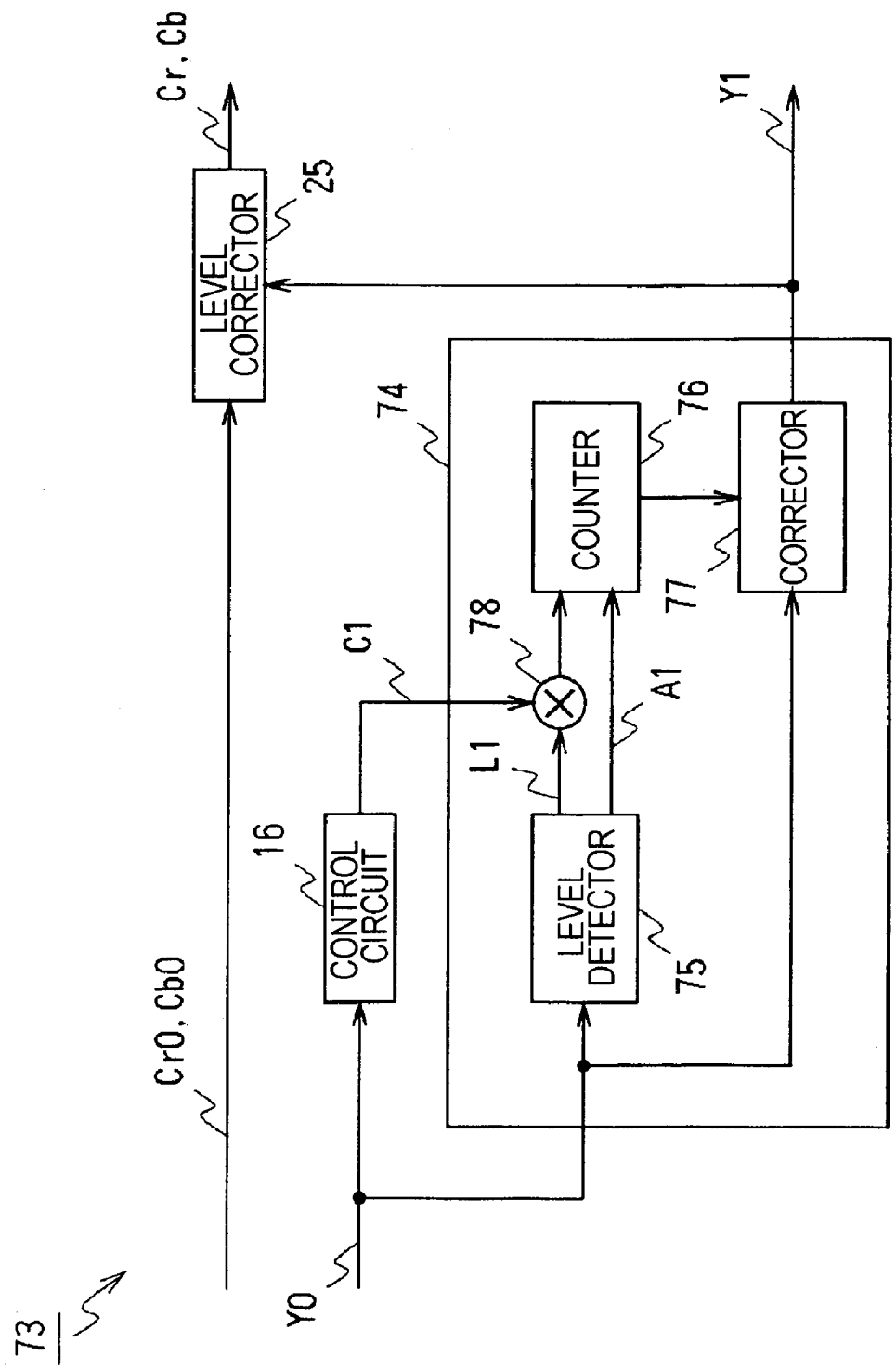
FIG. 10 is a block diagram of an image processing circuit in an image pickup apparatus in accordance with a fourth embodiment of the present invention.

FIG. 10 is a block diagram of an image processing circuit 73 used in an image pickup apparatus in accordance with a fourth embodiment of the present invention. The image processing circuit 73 enhances contrast of luminance data Y, and color difference data Cr and Cb, thereby improving image quality. The image pickup apparatus of the fourth embodiment is identical in structure to the image pickup apparatus 10 of the first embodiment except that the image processing circuit 73 is used. In the image processing circuit 73, elements identical to those of the image pickup apparatus 10 of the first embodiment are designated with the same reference numerals, and the discussion thereof is omitted herein.

The image processing circuit 73 detects a histogram of the luminance data Y0, and enhances the luminance data Y0 so that contrast increases in a tonal gradation segment having a high frequency of occurrence. The control circuit 16 variably controls the degree of enhancement.

Figure 11A:
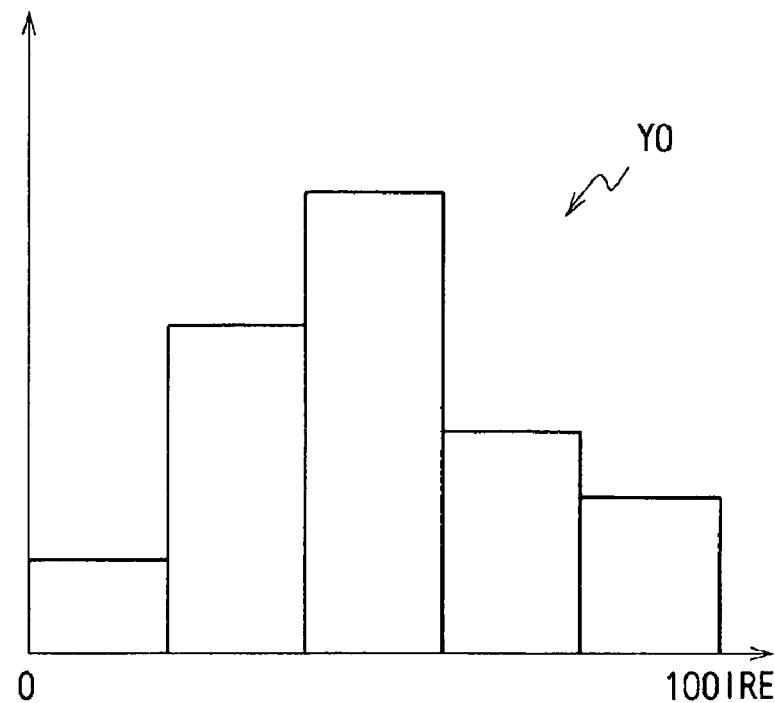
FIGS. 11A and 11B are plots of characteristics representing gradation correction of the image processing circuit of FIG. 10.
Figure 11B:
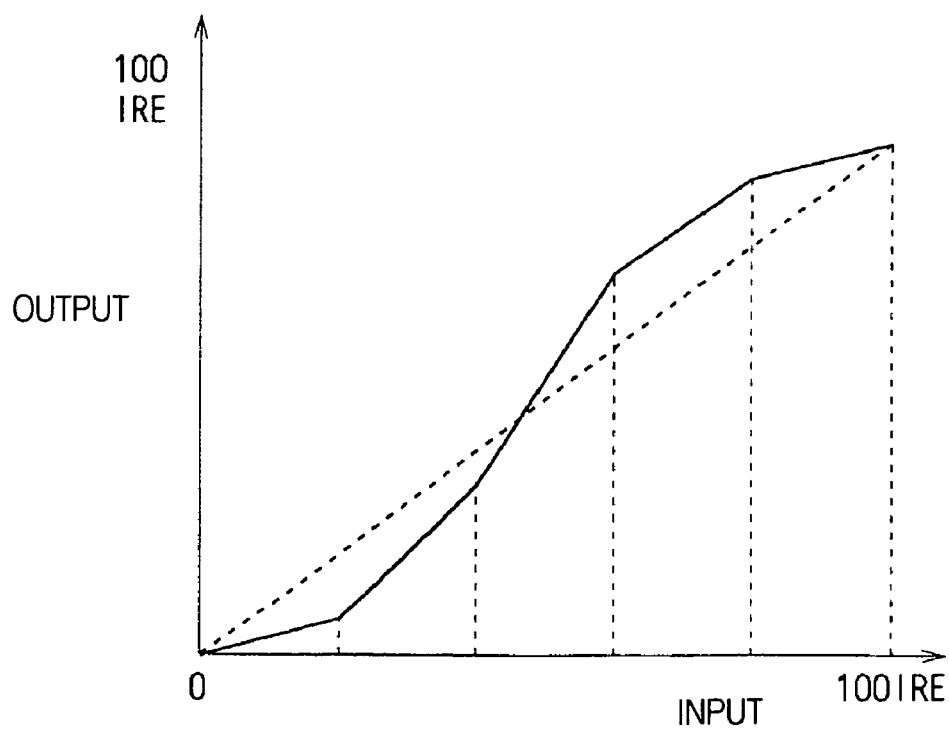
Figure 12A:
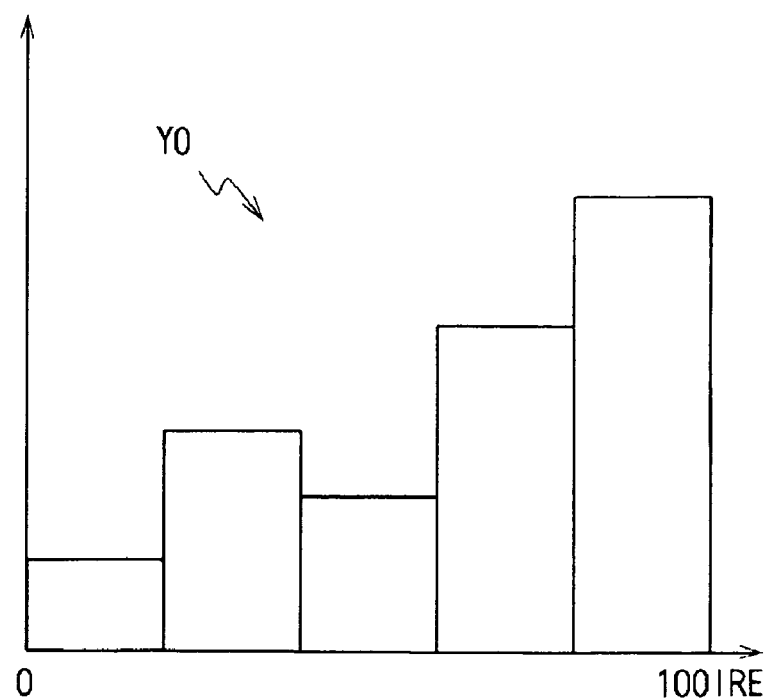
FIGS. 12A and 12B are plots of characteristics representing gradation correction different from the characteristics of FIGS. 11A and 11B.
Figure 12B:
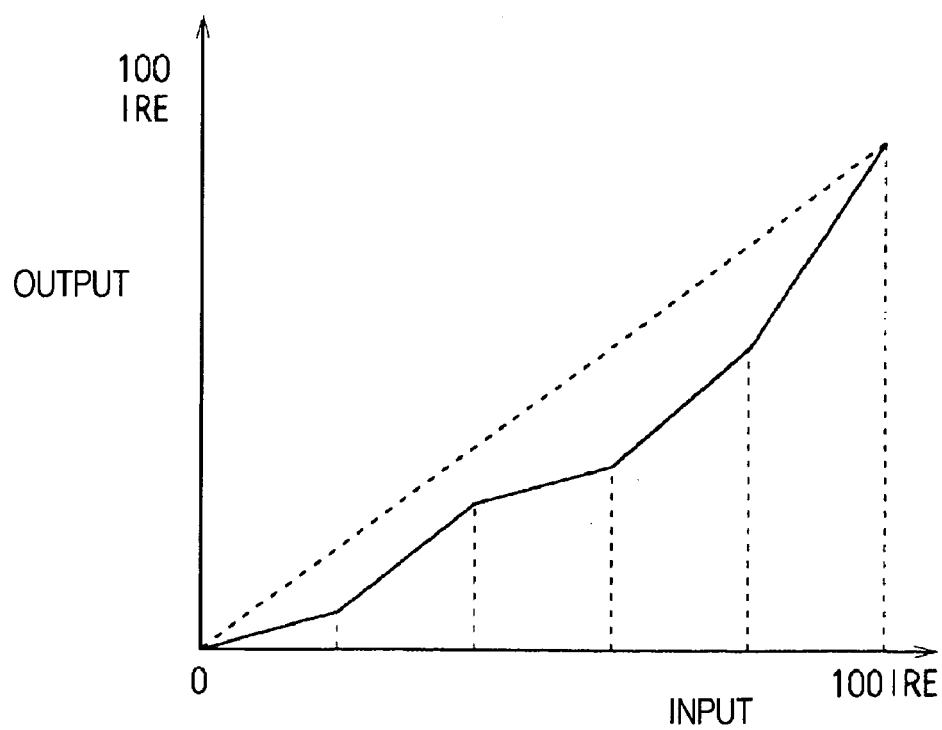
Figure 13A:
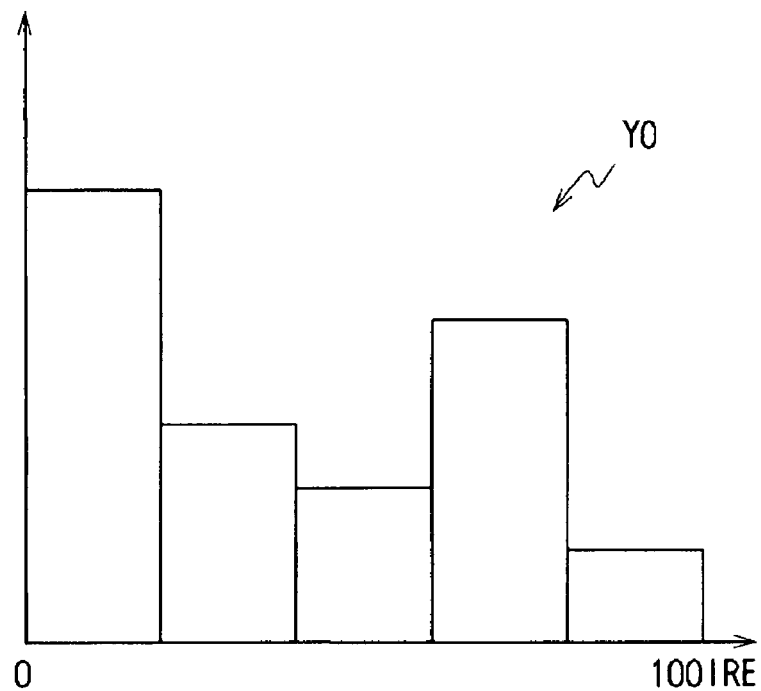
FIGS. 13A and 13B are plots of characteristics representing gradation correction different from the characteristics of FIGS. 11A and 11B and FIGS. 12A and 12B.
Figure 13B:
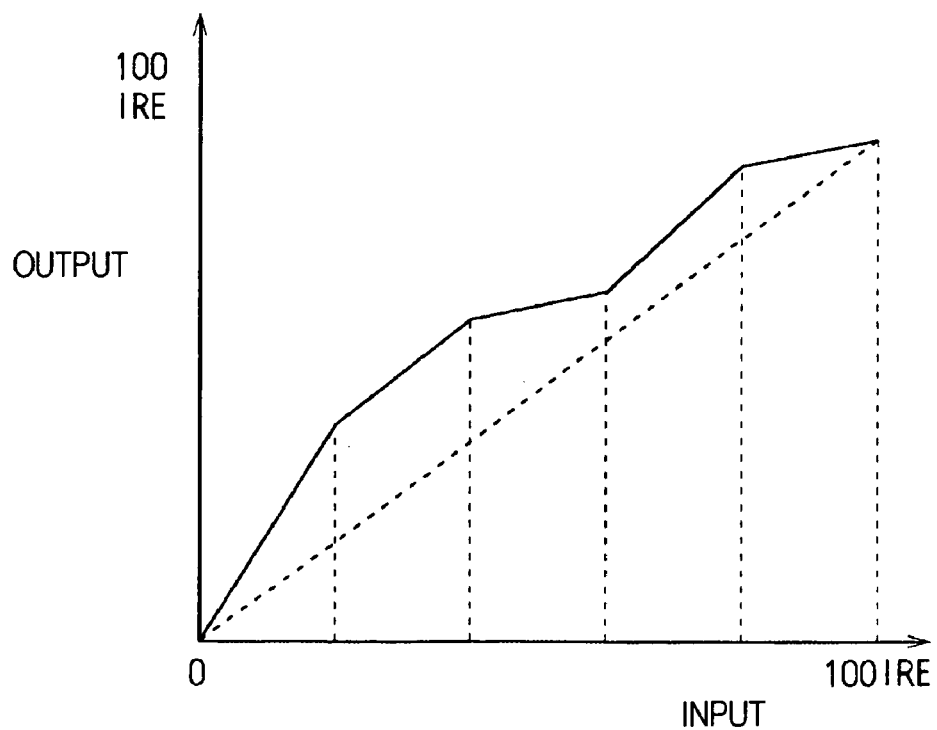
Figure 15:
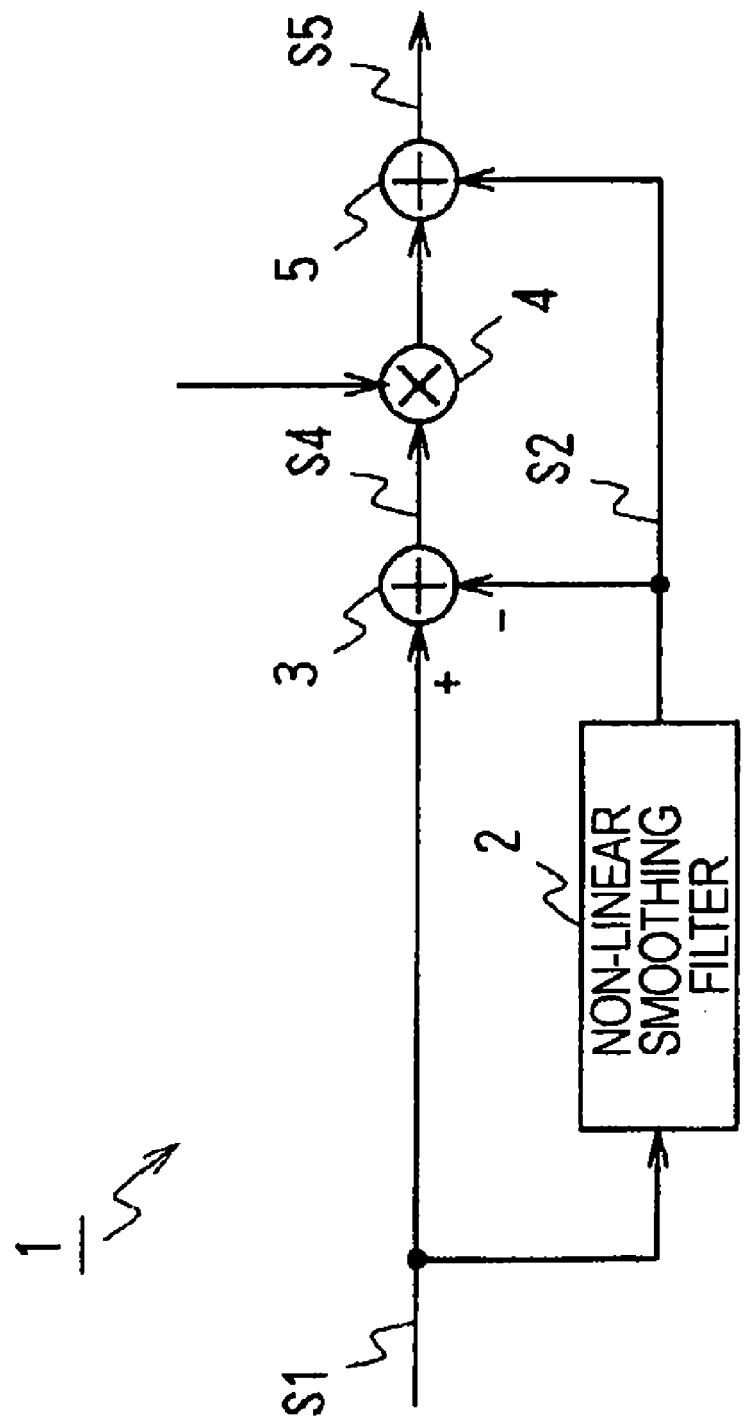
FIG. 15 is a block diagram of a known image processing circuit.

If the luminance data Y0 provides a high frequency of occurrence in an intermediate tonal gradation segment as shown in FIG. 11A, the image processing circuit 73 sets input-output characteristics to the luminance data Y0 so that contrast increases in the intermediate tonal gradation segment as shown in FIG. 11B, and then outputs the luminance data Y1. If the luminance data Y0 provides a high frequency of occurrence in a high tonal gradation segment as shown in FIG. 12A, the image processing circuit 73 sets input-output characteristics to the luminance data Y0 so that contrast increases in the high tonal gradation segment as shown in FIG. 12B, and then outputs the luminance data Y1. If the luminance data Y0 provides a high frequency of occurrence in a low tonal gradation segment as shown in FIG. 13A, the image processing circuit 73 sets input-output characteristics to the luminance data Y0 so that contrast increases in the low tonal gradation segment as shown in FIG. 13B, and then outputs the luminance data Y1. The image processing circuit 73 thus increases apparent contrast.

In the image processing circuit 73, a level detector 75 in an image quality corrector 74 successively determines signal levels of the luminance data Y0, and outputs an address A1 indicating which tonal gradation segment of the histogram each sample value of the luminance data Y0 falls within and a measurement value L1 as a number of samples of the address A1.

A counter 76 receives the address A1 and the measurement value L1, and accumulates the measurement values L1 of the address A1 on a per frame unit basis, thereby detecting the histogram. The counter 76 analyzes the histogram to determine the input-output characteristics so that contrast at a tonal gradation segment providing a high frequency of occurrence is increased. The counter 76 requests a corrector 77 to operate in accordance with the determined input-output characteristics.

The corrector 77 receives the luminance data Y0 and outputs the luminance data Y1 in accordance with the input-output characteristics provided by the counter 76. Based on the histogram, the image quality corrector 74 corrects the tonal gradation of the luminance data Y1 so that contrast at the tonal gradation segment providing a high frequency of occurrence is increased, and outputs the corrected tonal gradation.

If the histogram is merely detected and the tonal gradation is adjusted so that contrast at the tonal gradation segment providing a high frequency of occurrence is increased, contrast at an area of an important subject may drop. As shown in FIG. 14A1, a person as a subject may occupy a relative large area of the frame with the relatively flat background. If the histogram is merely detected, and the tonal gradation is adjusted so that contrast at a tonal gradation segment providing a high frequency of occurrence is increased, contrast at the area of the person increases. Apparent contrast is thus increased.

If the subject occupies a relatively small area as shown in FIG. 14A2 as opposed to FIG. 14A1, the area of the subject cannot be detected as a tonal gradation segment providing a high frequency of occurrence depending on the histogram. Contrast of the background thus increases while the contrast of the person decreases.

The image processing circuit 73 causes the measurement value L1 output from the level detector 75 to input to the counter 76 via a multiplier 78. The multiplier 78 multiplies the measurement value L1 by the correction coefficient C1.

Since the subject, which is more important than the other portion, has a great deal of high-frequency components, the correction coefficient C1 becomes larger than on the background as shown in FIGS. 14B1 and 14B2 in view of FIG. 3B. The histogram detected with the measurement value L1 multiplied by the correction coefficient C1 causes the frequency of occurrence of a tonal gradation corresponding to the background to be lower and the frequency of occurrence of a tonal gradation corresponding to the area of the person to be higher, than the histogram detected with the measurement value L1 not multiplied by the correction coefficient C1. Even if the person is photographed to occupy a small area, contrast of the person can be increased.

An increase in contrast leads to an increase in noise. If the histogram is adjusted using the correction coefficient C1 in the present embodiment, an increase in contrast is controlled in a flat area having slight degree of high-frequency component, thereby making noise less pronounced. Conversely, contrast is sufficiently increased in a high-frequency component area where the presence of noise draws less the attention of the user. Noise caused image degradation is thus reduced more than in the known art, and contrast at the subject area is increased.

In accordance with the fourth embodiment, the histogram is detected and the tonal gradation of the luminance data is adjusted so that contrast at the tonal gradation segment providing a high frequency of occurrence is increased. As the high-frequency component is intensified, the degree of enhancement of the luminance data is increased. In comparison with the known art, the noise caused image degradation is reduced while contrast is increased.

In the preceding embodiments, the high-frequency component is enhanced to enhance partially the tonal gradation. The present invention is not limited to this method. For example, the present invention is applicable to a variety of video data, for example, in order to enhance chroma saturation.

In accordance with the third embodiment of the present invention, the video data is smoothed in a vertical direction using the non-linear smoothing filter after being smoothed in a horizontal direction. The present invention is not limited to this method. Alternatively, the video data may be smoothed in a horizontal direction after being smoothed in a vertical direction.

In accordance with the third embodiment, the smoothing process result and the input video data are weight averaged and then output, and the weight coefficients for use in the weight averaging process are switched depending on the detection result of the weak edge component. The present invention is not limited to this method. If sufficient performance is practically attained, the weight averaging process may be omitted.

In accordance with the third embodiment of the present invention, the reference value for use in the non-linear smoothing process is adaptively switched. The present invention is not limited to this method. If sufficient performance is practically attained, the smoothing process may be performed with a fixed reference value.

In accordance with the third embodiment of the present invention, the smoothing process is performed both in a vertical direction and a horizontal direction using the ϵ filter. The present invention is not limited to this method. A variety of filters that can smooth the input video data with the edge component preserved can be used. If sufficient performance is attained, an ϵ filter may be used for the non-linear smoothing filter.

In each of the above-described embodiments, the luminance data is processed and the color difference data is processed using the process result of the luminance data. The present invention is not limited to this method. The color difference data may be processed in the same manner as the luminance data. Alternatively, the input video data may be processed at the color data phase thereof.

The above-described embodiments process video data, namely, moving image data. The present invention is not limited to the process of the moving image data. The present invention is also applicable to the process of still image data.

In each of the above-described embodiments, the image pickup apparatus processes video data as an image pickup result. The present invention is not limited to the process of the video data as an image pickup result. For example, the present invention is also applicable to image processing by using a variety of video apparatuses including a television receiver, and a digital versatile disk (DVD) recorder, or by executing a program on a computer. When the present invention is applied to the program to be executed on the computer, the program may be installed beforehand onto the computer or may be supplied to the computer in a variety of recording media including an optical disk, a magneto-optical disk, or a memory card, or may be downloaded to the computer via a network such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    an image quality corrector for correcting an image quality of input video data by enhancing the input video data;
    a controller for controlling the image quality corrector, the controller detecting a signal level of a high-frequency component of the input video data and controlling the image quality corrector in response to the signal level detection result so that the degree of enhancement of the input video data is increased in response to an increase in the signal level of the high-frequency component, wherein the degree of enhancement of the input video data is held constant when the signal level of the high frequency component rises above a predetermined value; and
    wherein the degree of enhancement of the input video data is less than zero when the signal level of the high frequency component falls below a predetermined threshold value.

2. The information processing apparatus according to claim 1, wherein the image quality corrector enhances the high-frequency component of the input video data.

3. The information processing apparatus according to claim 2, wherein the image quality corrector comprises:
    an image quality correction component extractor for extracting the high-frequency component from the input video data;
    a level adjuster for adjusting, under the control of the controller, the signal level of the high-frequency component extracted by the image quality correction component extractor; and
    an adder for adding an output signal from the level adjuster to the input video data.

4. An image processing method comprising steps of:
    correcting an image quality of input video data by enhancing the input video data;
    detecting a signal level of a high-frequency component of the input video data;
    performing a control process in response to the signal level detection result so that the degree of enhancement of the input video data is increased in response to an increase in the signal level of the high-frequency component, wherein the degree of enhancement of the input video data is held constant when the signal level of the high frequency component rises above a predetermined level; and
    wherein the degree of enhancement of the input video data is less than zero when the signal level of the high frequency component falls below a predetermined threshold value.

5. A recording medium storing a computer program for causing a computer to correct image quality of input video data, the computer program comprising steps of:
    correcting an image quality of input video data by enhancing the input video data;
    detecting a signal level of a high-frequency component of the input video data;
    performing a control process in response to the signal level detection result so that the degree of enhancement of the input video data is increased in response to an increase in the signal level of the high-frequency component, wherein the degree of enhancement of the input video data is held constant when the signal level of the high frequency component rises above a predetermined level; and
    wherein the degree of enhancement of the input video data is less than zero when the signal level of the high frequency component falls below a predetermined threshold value.

* * * * *